United States Patent [19]
Catone

US005800740A

[11] Patent Number: 5,800,740
[45] Date of Patent: Sep. 1, 1998

[54] ANTIMONY PENTOXIDE DISPERSIONS AND METHOD OF MAKING

[75] Inventor: David L. Catone, Hopkinton, Mass.

[73] Assignee: Nyacol Products, Inc., Ashland, Mass.

[21] Appl. No.: 738,076

[22] Filed: Oct. 25, 1996

[51] Int. Cl.$^6$ ............ C09K 21/04; C09K 21/10; B01F 3/12; C09D 5/18
[52] U.S. Cl. .......... 252/610; 252/609; 252/313.1; 252/309; 252/363.5; 106/18.28
[58] Field of Search ............ 252/313.1, 309, 252/363.5, 610, 609, 611; 106/18.28

[56] References Cited

U.S. PATENT DOCUMENTS

| | | | |
|---|---|---|---|
| 4,026,819 | 5/1977 | Langere et al. | 252/309 |
| 4,028,266 | 6/1977 | Langere et al. | 252/309 |
| 4,348,301 | 9/1982 | Crompton et al. | 423/617 |
| 4,770,813 | 9/1988 | Watanabe et al. | 252/309 |
| 4,988,505 | 1/1991 | Watanabe et al. | 424/76.3 |
| 5,008,036 | 4/1991 | Crompton et al. | 252/313.1 |
| 5,182,048 | 1/1993 | Kintz et al. | 252/363.5 |

Primary Examiner—Joseph D. Anthony
Attorney, Agent, or Firm—Alvin Isaacs

[57] ABSTRACT

Process for preparing an aqueous dispersion of antimony pentoxide sol useful for flame retardancy consisting of the steps forming an aqueous dispersion of phosphated antimony pentoxide sol; mixing the aqueous dispersion with a water-soluble alkanol amine; and concentrating the dispersion to provide an aqueous dispersion containing at least 50 percent by weight of antimony pentoxide; and aqueous antimony pentoxide sol dispersions prepared thereby.

7 Claims, No Drawings

ANTIMONY PENTOXIDE DISPERSIONS AND METHOD OF MAKING

BACKGROUND OF THE INVENTION

This invention relates to antimony pentoxide dispersions and to the use of same to provide flame retardancy to acrylic fibers.

Antimony pentoxide sols have heretofore been employed commercially to provide flameproofing or flame retardancy to various articles. For example, Nyacol Products, Inc., assignee of this invention manufactures and sells under the trade designation: ADP 494 a polar solvent-dispersible colloidal antimony pentoxide powder.

The patent literature is also replete with reference to antimony pentoxide flame retardants. While not intended to be a complete survey of such references in the patent literature, the following U.S. patents may nevertheless be taken as being illustrative: U.S. Pat. No. 3,676,362 issued to Yates; U.S. Pat. No. 3,860,523 issued to Petrow et al.; U.S. Pat. No. 3,873,451 issued to Cumbo et al.; U.S. Pat. No. 4,017,418 issued to Crompton et al.; U.S. Pat. No. 4,028,266 issued to Langere et al.; U.S. Pat. No. 4,051,064 issued to Crompton et al.; U.S. Pat. No. 4,285,900 issued to Cazzaro et al.; U.S. Pat. No. 4,348,301 issued to Crompton et al.; U.S. Pat. Nos. 4,589,997, 4,608,198 and 4,770,813 issued to Watanabe et al.; U.S. Pat. No. 5,008,036 issued to Crompton, et al.; U.S. Pat. No. 5,182,048 issued to Kintz and the instant Applicant, David L. Catone and assigned to Nyacol Products, Inc.; and U.S. Pat. No. 5,314,530 issued to Wierer et al.

Of these patents, U.S. Pat. No. 5,182,048 issued to Kintz and the present Applicant as joint inventors; and U.S. Pat. No. 5,008,036 are considered to be the most relevant to the present invention and further background discussion will accordingly be devoted to these two patents.

The '048 patent is directed to the task of providing improved dispersibility in polar solvents of colloidal pentoxide powders which had previously been prepared by admixing colloidal antimony pentoxide, phosphoric acid and a suitable ethoxylated fatty acid amine and then drying in air to an adsorbed moisture content of no greater than three percent.

As disclosed therein, this task is solved by the steps of: (1) forming a sol consisting of antimony pentoxide sol and phosphoric acid; (2) concentrating the sol until the concentration by weight of antimony pentoxide is at least 35 percent, preferably 50 percent or more without gelation; (3) adding the concentrated phosphated sol to ethoxylated fatty acid amine; and (4) drying the resulting mixture to provide a colloidal antimony pentoxide powder having an adsorbed moisture content of no greater than 3.0 percent in order to provide the commercially available ADP 494 which is characterized as permitting at least 99.9 percent to pass through an 8 micron filter or, stated another way, in which 0.1 percent or less will not pass through this filter, thereby having improved dispersibility in a polar solvent. The antimony pentoxide powders are then employed to provide flame retardance by coating the textile or other article to be treated with a dispersion comprising the powder in a polar solvent, e.g. acetone, acrylonitrile, dimethylacetamide, methylethylketone, etc., and then drying to remove the solvent. In accordance with the patented invention, the presence of the phosphoric acid and the recited ethoxylated fatty acid amine in the colloidal powders is stated to be necessary to provide dispersibility in the polar solvent.

While the colloidal pentoxide powders described and claimed in U.S. Pat. No. 5,182,048 are completely satisfactory for use in the described manner and have in fact enjoyed commercial success, it has now been found that certain end users of the colloidal antimony pentoxide flame retardants manufactured and sold by Nyacol Products, Inc., assignee of this invention, require the pentoxide flame retardant be provided as a dispersion rather than as a powder.

The aforementioned U.S. Pat. No. 5,008,036 issued to Crompton et al. and assigned to Laurel Industries, Inc. is directed to colloidal dispersions of hydrous antimony pentoxide particles prepared by a process comprising introducing antimony metal or antimony trioxide into an essentially aqueous medium and contacting the antimony component with hydrogen peroxide to convert the antimony component to colloidal particles of antimony pentoxide. The step of contacting the antimony component with the peroxide may be done with or without the presence of an alkanolamine, alkanolamine salt, α-hydroxycarboxylic acid or polyhydroxy alcohol stabilizer. In Col. 4 useful alkanolamines are said to be water-soluble, e.g. diethanolamine and triethanolamine. In Col. 5 it is stated that the colloidal sols may be dried to a fine powder which may be redispersed to reform highly stable colloidal dispersions in an essentially aqueous media. In the paragraph bridging Cols. 5 and 6 it is recited that the colloidal dispersions are well suited for use in synthetic fibers and plastics because the particle size is from less than 40 Å to approximately 300 Å and the sols are compatible with many organic solvents which are useful for spinning and film casting of many polymers, including polyacrylonitrile, copolymers of acrylonitrile with vinyl and vinylidene halides, polyamides, polyesters, polyurethanes, polyacrylates, polyvinyl chloride, acrylonitrile-butadiene-styrene polymers, etc. Useful solvents are stated to include methanol, ethylene glycol, acetic acid, dimethylformamide, dimethylacetamide, formamide, trimethylolpropane, etc.

Example XI of the '036 patent is considered to be relevant as background information to the state of the art with respect to the present invention to be detailed hereinafter. As recited in this example, an aqueous solution of triethanolamine phosphate is first formed by mixing triethanolamine with phosphoric acid in water. Antimony trioxide and hydrogen peroxide are heated to reflux in a separate container and the triethanol phosphate solution was then added to the reaction mixture to form a colloidal dispersion of hydrous antimony pentoxide particles containing approximately 9% antimony, has an average particle size of less than 40 Å and is stabilized with approximately 0.3 moles of the alkanolamine salt per mole of antimony.

Having disclosed above the prior art known to Applicant and having discussed the prior art believed most relevant to the present invention which will be described in detail hereinafter.

Stated simply, the task of this invention is to provide an aqueous dispersion of antimony pentoxide sol useful for flame retardancy and which is characterized as containing at least 50 percent by weight of the total dispersion of antimony pentoxide and most preferably at least 55 percent by weight of antimony pentoxide wherein the sol is characterized as being essentially free of agglomeration such that substantially all of the sol will pass through an 8 micron filter.

BRIEF DESCRIPTION OF THE INVENTION

In accordance with this invention the task is solved in an elegant manner by the steps of forming an aqueous dispersion of a phosphated sol consisting of antimony pentoxide and phosphoric acid; preferably concentrating the sol, e.g.

until the concentration of antimony pentoxide is at least 35 percent; mixing the resulting dispersion with an alkanol amine and further concentrating the dispersion to provide an aqueous dispersion containing at least 50 percent and preferably in excess of 55 percent by weight of antimony pentoxide.

DETAILED DESCRIPTION OF THE INVENTION

As heretofore noted, Nyacol Products, Inc., assignee of this invention, has heretofore manufactured and sold a colloidal antimony pentoxide powder having improved dispersibility in polar solvents for treating textiles or other articles to provide flame retardancy to the article.

While these colloidal pentoxide powders have enjoyed considerable commercial success, the Assignee has now found it to be desirable to manufacture and sell an aqueous dispersion of the colloidal antimony pentoxide which may then be incorporated into a polar solvent containing polymeric material which may then be passed through a spinneret by known procedures to form flame retardant synthetic fibers for subsequent manufacture of various textile articles including articles of apparel where flame retardancy is most desired for obvious safety reasons.

As will be readily appreciated, from the standpoint of shipping and distribution of the dispersion to end users, it is most desirable that the aqueous dispersion be concentrated at least to the desired proportion to be admixed with polar solvent by the end user prior to being ejected through a spinneret to form synthetic fibers for manufacture of fabrics and other articles of manufacture.

Applicant has determined that it is not commercially possible to concentrate antimony pentoxide sol alone in water to a concentration greater than on the order of 15 percent. On the other hand, while the antimony pentoxide sol treated with phosphoric acid to form a phosphated antimony pentoxide sol can be concentrated to a greater percentage, it is nevertheless extremely difficult to concentrate the pentoxide treated with phosphate to concentrations up to 50 percent or slightly more. Since the pH of the phosphated sol is objectionably low for commercial use in most polymer systems, it is necessary to elevate the pH, say, for example from pH of about 2 to a pH on the order of 4. Since sodium and potassium anions adversely affect flame retardancy, an amine is employed to raise the pH in order to effect a change in surface characteristics of the sol favoring greater compatibility with polymer systems.

In forming the desired aqueous colloidal pentoxide sol rather than the colloidal antimony pentoxide powder provided by the invention described and claimed in the aforementioned U.S. Pat. No. 5,182,048 of which the present Applicant was a coinventor, it was determined that the ethoxylated fatty alkyl amines employed in the '048 patented system cause a foaming which is undesirable in the aqueous dispersion. What is required for obtaining the commercial aqueous dispersion is a neutralizing agent which is chemically innocuous in this use and which causes at most very minimal foaming.

In accordance with this invention, a water-soluble alkanolamine is employed to affect the desired neutralization, diethanolamine or triethanolamine being preferred. Other water-soluble alkanolamines may be readily suggested to those skilled in the art in the light of this disclosure.

The colloidal antimony pentoxide aqueous dispersions of this invention may then be admixed with a solution of the desired polymeric material in a polar solvent. The particular polymer employed by the end user to form the fibers as well as the selection of the polar solvent in which it is soluble per se comprise no part of this invention.

However, by way of illustration, examples of polymers which can be made flame resistant by incorporation of the sols of this invention include acrylonitrile polymers such as polyacrylonitrile, copolymers of acrylonitrile with vinyl halides and copolymers of acrylonitrile with vinylidene halides, polyamides such as nylon, polyesters such as Mylar, polyurethanes, polyacrylates, vinyl halide polymers such as polyvinyl chloride and vinyl chloride/vinyl acetate copolymers, acrylonitrile-butadiene-styrene terpolymers, etc.

Useful polar solvents for dissolving the aforementioned polymers include dimethylacetamide, dimethylformamide, formamide, methylacetamide, dimethylsulfoxide, dimethylsulfone, tetramethylurea, diethylene glycol ethers, acetone, etc.

The solution containing the colloidal antimony pentoxide aqueous dispersion comprising a mixture of phosphated antimony pentoxide and amine and the solution of the desired polymeric material for forming the synthetic fiber in a polar solvent may then be employed with a spinneret to form the desired synthetic fibers.

As known, a spinneret is a device for making synthetic fibers consisting of a plate pierced with at least one hole through which the polymeric material is extruded and allowed to harden. This may be provided by three different methods involving spinning from liquids: (1) wet spinning wherein the stream from the spinneret enters a liquid solution of substances that cause the fiber to harden; (2) dry spinning wherein the polymeric substance to be made into fibers is first dissolved in a liquid that can evaporate easily and the solution passes through the spinneret into a chamber where it meets a current of warm air so that the solvent quickly changes to vapor which is carried away to be recovered and used again while the fiber is taken up on a reel; and (3) melt spinning wherein the fiber-forming material is heated to make it liquefy, then forced through the spinneret into a cooling chamber to solidify.

The present invention contemplates employment by the end user in wet spinning procedures in which the spinneret may have one small opening or a plurality of such openings. A spinneret with only one hole will form a single strand called a monofilament, of any desired length. A spinneret with many small holes forms a bundle of fine filaments, all at the same time. The bundle, with others from other spinnerets, may if desired be gathered into a tow, which is then cut into short pieces called staple that can be made into yarn.

In any case, after spinning, most man-made or synthetic fibers are stretched to about five times their original length, causing the molecules of the polymer to align or become molecularly oriented along the direction of the fiber and to come much closer together. The result of this stretching is that the molecules cling very tightly to each fiber so that the fiber becomes much stronger. The stretching or drawing may be done simply by applying tension as the fibers are taken up on a reel.

As was previously discussed, the presence of both the phosphoric acid and the amine in the antimony pentoxide sols provide the dispersibility in an aqueous medium necessary to obtain the desired concentration of antimony pentoxide in the dispersion, e.g. concentrations in excess of 50 percent by weight. Although the percentages of each to be employed are not capable of precise quantification, the selection of particular percentages to be employed will at most require routine experimentation within the expected judgment of the skilled worker in order to obtain a dispersion of the desired concentration of antimony pentoxide sol. Accordingly, as used in the appended claims the amounts so used will be defined as being "effective amounts", meaning amounts sufficient to provide the desired effective dispersibility in the aqueous medium and in turn of the aqueous dispersion in the selected polar solvent. However, by way of illustration only, amounts of phosphoric acid as low as about 2.2 percent of the weight of the antimony pentoxide and of amine as low as 4.0 percent by weight of the antimony pentoxide have been found to be acceptable.

To prepare a dispersion of the antimony pentoxide flameproofing agent and the polymeric material to be protected from burning in accordance with this invention, the end user simply prepares a solution of the selected polymeric material in the polar solvent of choice and adds to it an aqueous dispersion of the antimony pentoxide of this invention in a ratio by weight of antimony pentoxide dispersion to polar solvent solution sufficient to provide the requisite flameproofing, after which the resulting dispersion may be forced through a spinneret, as heretofore described, to form fibers exhibiting flameproof characteristics. By way of illustration, the ratio of aqueous antimony pentoxide dispersion to polar solvent solution may be, for example, on the order of from about 1:10 to about 1:30 by weight aqueous dispersion to polar solvent.

The following examples show by way of illustration and not by way of limitation the practice of this invention.

EXAMPLE 1

Antimony pentoxide sol is treated with phosphoric acid (85%), the amount of phosphoric acid employed being about 2.2 percent by weight of the antimony pentoxide. The resulting sol is then concentrated by boiling to provide a phosphated sol containing about 37.7 percent antimony pentoxide having a specific gravity of 1.538. Triethanol amine is added slowly to raise the pH of the dispesrion to about 4.0. The resulting dispersion is then further concentrated to provide an aqueous dispersion of phosphated antimony pentoxide sol and amine containing about 50 percent antimony pentoxide.

EXAMPLE 2

Example 1 is repeated, except that the triethanolamine was added to raise the pH to about 5.

EXAMPLE 3

Example 1 is repeated again, except that the triethanolamine was added to raise the pH to about 6.

EXAMPLE 4

Example 1 is repeated one more time, except that the triethanolamine was added to raise the pH to about 7.

EXAMPLE 5

Example 1 is repeated subsituting diethanolamine for the triethanolamine.

EXAMPLES 6–9

Examples 1–4, respectively, are repeated, each time admixing 10% by weight of the aqueous sol with 90 percent by weight of dimethylacetamide based upon the total weight of the resulting dispersion.

Examples 6–9 were prepared by Applicant simply to illustrate the practice of the invention. In commercial usage, as indicated above, the polar solvent, in this case dimethylacetamide will contain the polymer to be treated as well as any other reagents performing specific desired functions the end user may wish to incorporate.

It will be appreciated that various changes may be made without departing from the scope of the present invention. Accordingly, all matter contained in the foregoing description, including the specific examples, shall be taken as illustrative and not in a limiting sense, the scope of the invention being as defined in the appended claims.

What is claimed is:

1. The process for preparing an aqueous sol for use in providing flame retardancy to acrylic fibers consisting of the steps of:

(1) forming an aqueous dispersion of a phosphated antimony pentoxide sol;

(2) mixing the resulting aqueous dispersion with a water soluble alkanol amine; and (3) concentrating the dispersion to provide an aqueous dispersion containing at least 50 percent antimony pentoxide by weight, based upon the total weight of the dispersion, the sol being characterized as being essentially free of agglomeration such that substantially all of the sol will pass through an 8 micron filter.

2. The process as defined in claim 1 wherein the aqueous dispersion is concentrated to provide a dispersion containing at least 55 percent antimony pentoxide by weight, based upon the total weight of the dispersion.

3. The process as defined in claim 1 wherein the water-soluble alkanol amine is diethanolamine or triethanolamine.

4. The process for preparing an aqueous sol for use in providing flame retardancy to acrylic fibers consisting of the steps of:

(1) forming an aqueous dispersion of a phosphated antimony pentoxide sol;

(2) concentrating the aqueous dispersion to a first partial concentration;

(3) admixing the partially concentrated aqueous dispersion with a water soluble alkanol amine; and (4) concentrating the aqueous dispersion to a second concentration of at least 50 percent antimony pentoxide by weight, based upon the total weight of the dispersion, the sol being characterized as being essentially free of agglomeration such that substantially all of the sol will pass through an 8 micron filter.

5. The process as defined in claim 4 wherein the first partial concentration is to at least 35 percent by weight.

6. The process as defined in claim 4 wherein the aqueous dispersion is concentrated by the first and second concentration steps to provide a dispersion containing at least 55 percent antimony pentoxide by weight, based on the total weight of the dispersion.

7. The process as defined in claim 4 wherein the water-soluble alkanol amine is diethanolamine or triethanolamine.

* * * * *